H. FORD.
SPRING SUSPENSION.
APPLICATION FILED OCT. 13, 1911.
1,044,038.
Patented Nov. 12, 1912.
2 SHEETS—SHEET 1.
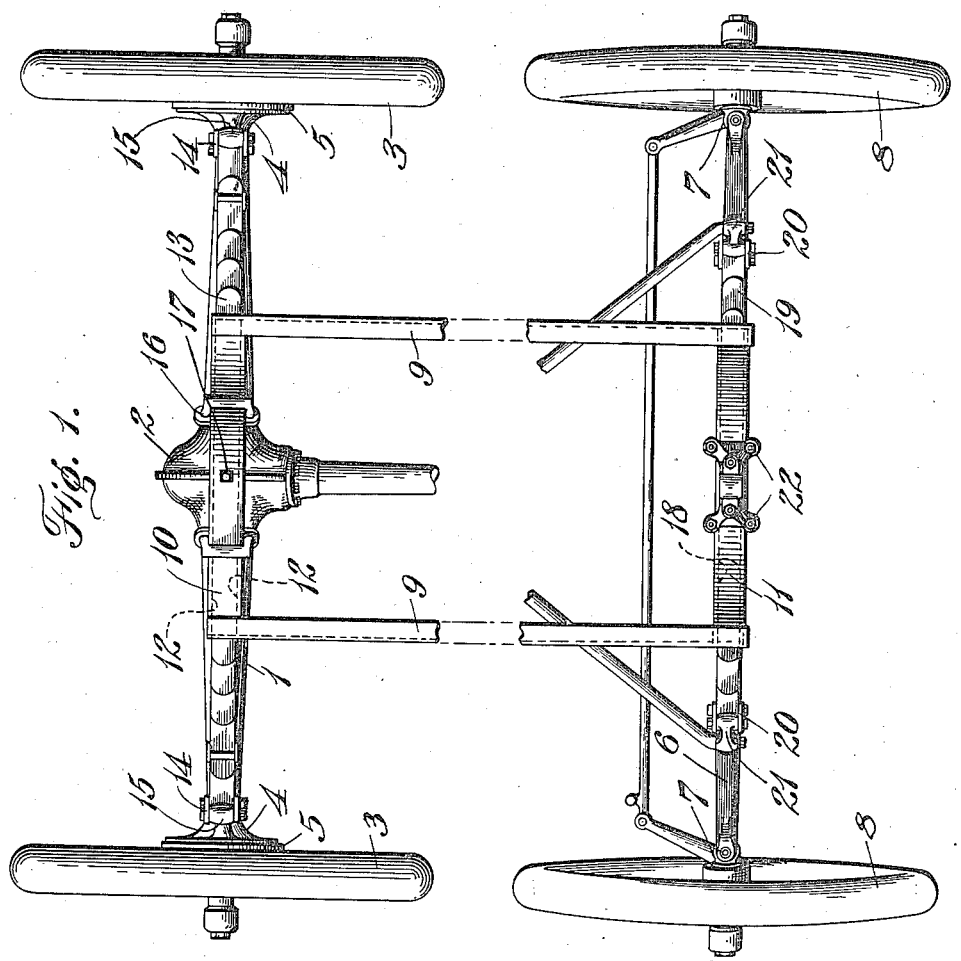
Witnesses
Chas. W. Stauffiger
F. E. Ernst
Inventor
Henry Ford,
By 
Attorneys H. FORD.
SPRING SUSPENSION.
APPLICATION FILED OCT. 13, 1911.
1,044,038.
Patented Nov. 12, 1912.
2 SHEETS—SHEET 2.
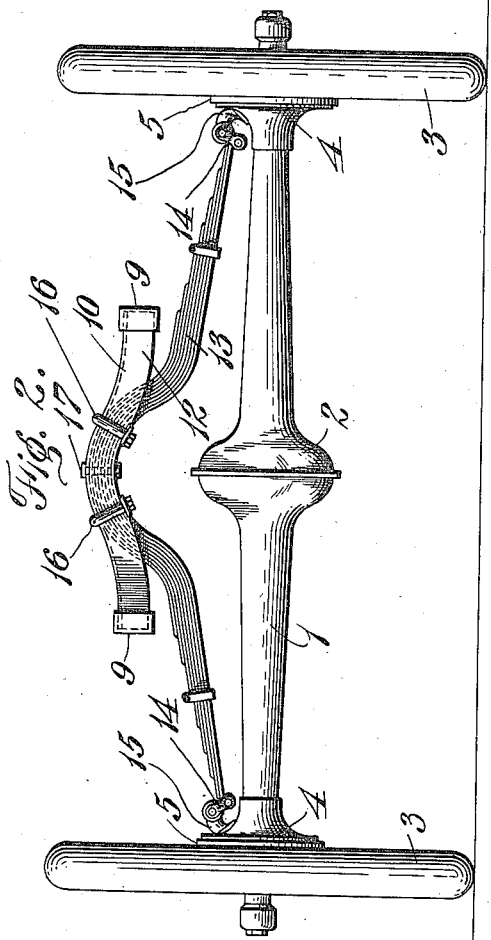
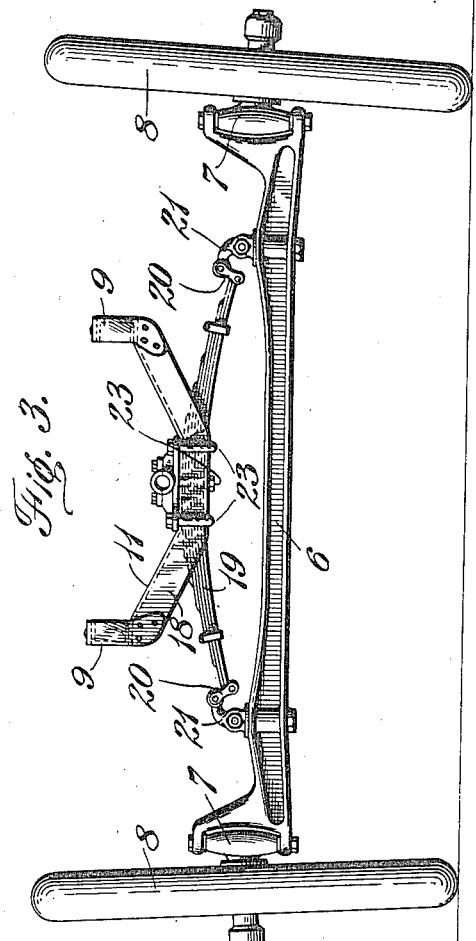

UNITED STATES PATENT OFFICE.

HENRY FORD, OF DETROIT, MICHIGAN.

SPRING SUSPENSION.

1,044,038.  Specification of Letters Patent.  Patented Nov. 12, 1912.

Original application filed July 21, 1909, Serial No. 508,779. Divided and this application filed October 13, 1911. Serial No. 654,435.

*To all whom it may concern:*

Be it known that I, HENRY FORD, a citizen of the United States of America, residing at Detroit, in the county of Wayne and State of Michigan, have invented certain new and useful Improvements in Spring Suspension, of which the following is a specification, reference being had therein to the accompanying drawings.

In automobile construction it is desirable that the chassis or frame which carries the driving mechanism be yieldingly supported on the axles in such manner that the load is distributed on or carried to the bearing wheels as directly as possible and at the same time the frame be allowed the necessary range of motion relative to the axles to travel readily over irregular road surfaces.

This invention relates to spring suspension for vehicles and more especially to an arrangement thereof whereby a frame is supported yieldingly by a pair of axles in such a manner that the latter may tilt as necessary while the load is conveyed in substantially a direct line to the bearing wheels.

The invention consists in the matters hereinafter set forth and more particularly pointed out in the appended claims.

In the drawings, Figure 1 is a plan view of a vehicle equipped with a spring suspension that embodies features of the invention, the central portion of the frame being broken away; Fig. 2 is a view in elevation of the rear axle and spring support for the frame; and Fig. 3 is a view in elevation of the front axle and spring support for the frame.

The general construction of the frame and the axles is shown in a pending application for automobile construction Serial No. 508,779, filed July 21, 1909 of which this is a divisional application.

As herein shown, a tubular rear axle 1 has an enlarged central portion 2 for housing differential transmission of any preferred type while traction bearing wheels 3 are journaled at the outer ends of the axle in any preferred manner and have operative connection with whatever mechanism may be used. Circular collars or flanges 4 are formed on the rear axle adjacent the wheels and brake drums 5 thereon. A forward axle 6 has the usual steering knuckles 7 on which steering bearing wheels 8 are journaled. A rectangular frame is formed of side members 9 held in spaced relation by a transverse rear member 10 and a similarly disposed forward member 11. The rear member 10, which is preferably of channel shape with its flanges 12 downturned, is arched to clear the enlargement 2 or housing of the rear axle 1 and to receive the crown of a leaf spring 13 above the axle 1 whose extremities are hooked onto shackles 14 that depend from hangers 15 extending inwardly from the collars 4. Or if the construction requires it, the collars may obviously be omitted and the hangers 15 spring directly from the arms of the rear axle. The crown of the spring is secured in position between the flanges 12 of the member 10 in any preferred manner as for example, by suitably arranged clips 16 and a bolt 17. The flanges prevent the tilting of the spring laterally while the suspension of the shackles 14 between the hangers 15 is such that endwise extension or longitudinal swinging of the spring is checked by the hangers 15 which act as stops. The forward transverse member 11 is preferably bent downwardly with its depending flanges 18 embracing the crown of a leaf spring 19 that is supported at its ends by shackles 20 suspended from hangers 21 mounted in any preferred manner on the axle 6 and adapted to act as stops to limit endwise play of the spring 19. Clips 22 and a bolt 23 or other preferred fastening means secure the spring 19 in position. By this arrangement of parts the load imposed on the frame is carried almost directly to the bearing wheels so that the strain on the axles is minimized. Free angular movement in vertical planes is afforded the axles relative to the frame while oscillation of the frame in lateral directions is checked by the spring hangers.

Obviously, changes in the details of construction may be made without departing from the spirit of the invention and I do not care to limit myself to any particular form or arrangement of parts.

What I claim is:—

1. In an automobile, an axle, a frame above the axle, a transverse member in the frame parallel to the axle bent to form a spring seat integral with the member between the ends thereof and a spring articulated at its ends to the axle and rigidly secured at its crown to said seat.

2. In an automobile, an axle, a frame over the axle, a transverse member in the frame parallel to the axle bent between its ends to form a spring seat, a spring articulated at its ends to the axle, and means rigidly securing the crown of the spring to the seat of the transverse member.

3. In an automobile, an axle, a frame over the axle, a transverse member in the frame parallel to the axle having depending marginal flanges, and a spring articulated at its ends to the axle and rigidly secured at its crown to the transverse member between the flanges thereof, the member being bent between its ends to form a spring seat conforming to the crown of the spring.

4. In an automobile, an axle, a frame over the axle, a transverse member in the frame parallel to the axle bent between its ends to form a seat for a spring, a pair of hangers on the axle, shackles swinging from the hangers, and a spring rigidly secured at its crown to the transverse member, and suspended by the shackles between the hangers.

5. In an automobile, a front axle, a rear axle, a frame over the axles, a transverse member on the frame over each axle bent between its ends to form a spring seat, and a spring over each axle articulated at its ends to the end portions of the axle and rigidly secured at its center to a transverse member.

6. In an automobile, a front axle, a rear axle, a pair of hangers on each axle, a transverse member on the frame over each axle bent between its ends to form a spring seat, shackles swinging from the hangers, and springs each secured at its middle portion to a transverse member and suspended at its ends by the shackles between the hangers.

7. In an automobile, a front axle, a rear axle, a frame thereover, transverse members on the frame each formed with depending flanges and bent between its ends to form a spring seat, a pair of hangers on each axle, shackles depending from the hangers, and springs each secured between its ends to a transverse member between the flanges thereon and suspended by the shackles between the hangers.

8. In an automobile, an axle, a frame thereover, a transverse member with depending flanges that is bent between its ends to form a spring seat, hangers extending upwardly from the extremities of the axle, shackles depending from the hangers, and a leaf spring bent upwardly between its ends to conform to the seat in the transverse member between the flanges thereof and suspended at its ends by the shackles between the spring hangers.

In testimony whereof I affix my signature in presence of two witnesses.

HENRY FORD.

Witnesses:
OTTO F. BARTHEL,
C. R. STICKNEY.